United States Patent
Shiratori et al.

(10) Patent No.: US 7,706,655 B2
(45) Date of Patent: Apr. 27, 2010

(54) SHELF-CARD ASSEMBLY FOR OPTIC FIBER CONNECTION

(75) Inventors: Masayuki Shiratori, Tokyo (JP); Shuichi Aihara, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 12/152,197

(22) Filed: May 13, 2008

(65) Prior Publication Data
US 2008/0298751 A1 Dec. 4, 2008

(30) Foreign Application Priority Data
May 29, 2007 (JP) ............................. 2007-142473

(51) Int. Cl.
G02B 6/00 (2006.01)
G02B 6/36 (2006.01)

(52) U.S. Cl. ........................... 385/135; 385/14; 385/88; 385/89; 385/90; 385/91; 385/92; 385/134

(58) Field of Classification Search ......... 385/134–135, 385/14, 88–92
See application file for complete search history.

(56) References Cited

U.S. PATENT DOCUMENTS

| | | | | |
|---|---|---|---|---|
| 4,863,232 A | * | 9/1989 | Kwa | ........................... 385/89 |
| 5,265,186 A | * | 11/1993 | Fishkin et al. | ............... 385/135 |
| 5,793,909 A | * | 8/1998 | Leone et al. | ................... 385/24 |
| 5,943,456 A | * | 8/1999 | Buchholz et al. | ............... 385/24 |
| 6,097,872 A | * | 8/2000 | Kusuda et al. | ............... 385/134 |
| 6,229,942 B1 | * | 5/2001 | Engberg et al. | ................ 385/39 |
| 6,263,136 B1 | * | 7/2001 | Jennings et al. | ................ 385/48 |
| 6,731,851 B2 | * | 5/2004 | Sato et al. | ..................... 385/135 |
| 2003/0132685 A1 | * | 7/2003 | Sucharczuk et al. | ....... 312/223.2 |
| 2005/0135770 A1 | * | 6/2005 | McClellan et al. | ........... 385/135 |
| 2006/0269206 A1 | * | 11/2006 | Zimmel | ....................... 385/135 |
| 2007/0189692 A1 | * | 8/2007 | Zimmel et al. | ............... 385/135 |

FOREIGN PATENT DOCUMENTS

| | | |
|---|---|---|
| JP | 08-211250 | 8/1996 |
| JP | 2004-171003 | 6/2004 |

* cited by examiner

Primary Examiner—Ryan Lepisto
(74) Attorney, Agent, or Firm—Collard & Roe, P.C.

(57) ABSTRACT

An assembly comprises first connection units attached to a shelf and second connection units attached to cards, respectively. Each first connection unit holds at least one first optic fiber, while each second connection unit holds at least one second optic fiber. The first connection unit is connected to the second connection unit so that the first optic fiber is connected to the second optic fiber. Each first connection unit comprises a body and an optic connector. Each body is floatingly supported by the shelf. Each optic connector is floatingly supported by the corresponding body. The double floating-support structure allows "blind mate" connections between the first and the second connection units.

9 Claims, 9 Drawing Sheets

SHELF-CARD ASSEMBLY FOR OPTIC FIBER CONNECTION

CROSS REFERENCE TO RELATED APPLICATIONS

Applicants claim priority under 35 U.S.C. §119 of Japanese Application No. 2007-142473 filed May 29, 2007.

BACKGROUND OF THE INVENTION

This invention relates to a shelf-card assembly or shelf-blade assembly as used in a blade server. In particular, the present invention relates to an assembly for optic fiber connection.

There have been proposed various kinds of shelf-card assemblies which comprise optic-fiber connection mechanisms in addition to or instead of electrical connectors so as to provide large-capacity, high-speed transmission with reduced heat generation. For example, JP-A 2004-171003 and JP-A H08-211250 disclose such shelf-card assemblies. The disclosed assemblies comprise optic fiber connection mechanisms which are attached to back panels or back planes of the assemblies.

However, the attachments of the optic fiber connection mechanisms to back panels result in poor maintainability. Therefore, there is a need for a shelf-card assembly which comprises optic fiber connection mechanisms at its front side.

SUMMARY OF THE INVENTION

According to one aspect of the present invention, an assembly comprises a shelf, a plurality of first connection units, a plurality of cards, and a plurality of second connection units. The shelf has a front side and a rear side in a first direction, has a height of the shelf in a second direction perpendicular to the first direction and has a width of the shelf in a third direction perpendicular to the first and the second directions. Each of the first connection units comprises a body and an optic connector. Each of the bodies is floatingly supported by the shelf and is positioned in the vicinity of the front side of the shelf. The optic connectors are floatingly supported by the bodies, respectively. Each of the optic connectors holds at least one first optic fiber. Each of the cards has a principal surface defined by the first and the second directions and has a front edge corresponding to the front side of the shelf. Each of the cards is inserted along the first direction into the shelf so that the card is detachably held by the shelf. Each of the second connection units holds at least one second optic fiber. Each of the second connection units is attached to a corresponding one of the cards and is positioned to the front edge. Each of the second connection units is detachably mated to a corresponding one of the optic connectors so that the second optic fiber of the second connection unit is aligned with the first optic fiber of the corresponding optic connector. Thus, the assembly according to one aspect of the present invention has a double floating-support structure for optic-fiber connection mechanism which allows "blind mate" connections between the first and the second connection units.

An appreciation of the objectives of the present invention and a more complete understanding of its structure may be had by studying the following description of the preferred embodiment and by referring to the accompanying drawings.

Figure 1:
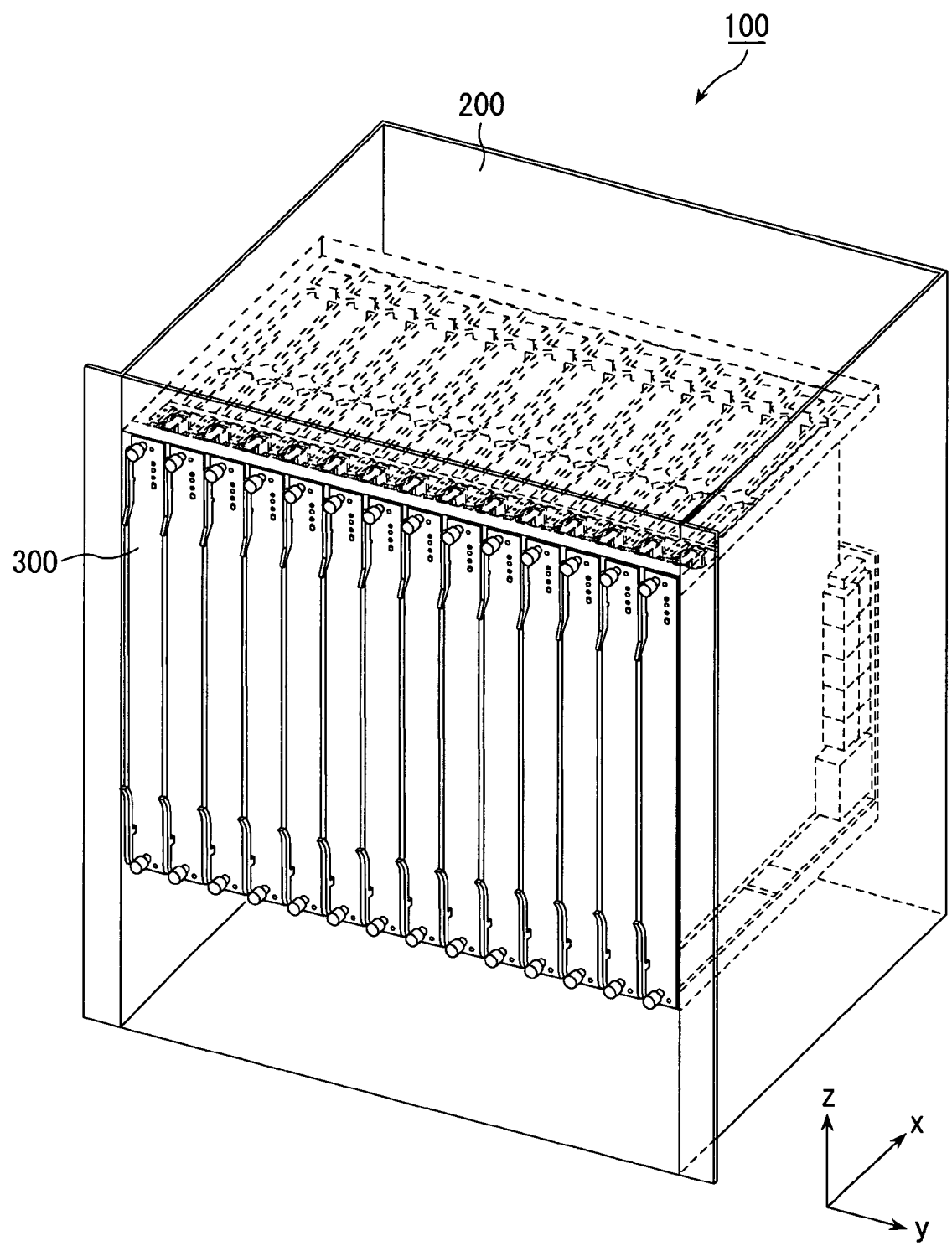
FIG. 1 is a perspective view showing a shelf-card assembly in accordance with an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

With reference to FIG. 1, an assembly 100 according to an embodiment of the present invention comprises a shelf 200 and a plurality of cards 300. The assembly 100 is basically compliant with the ATCA (Advanced Telecom Computing Architecture) standard; the shelf 200 is an ATCA shelf while the card 300 is an ATCA card or blade.

Figure 2:
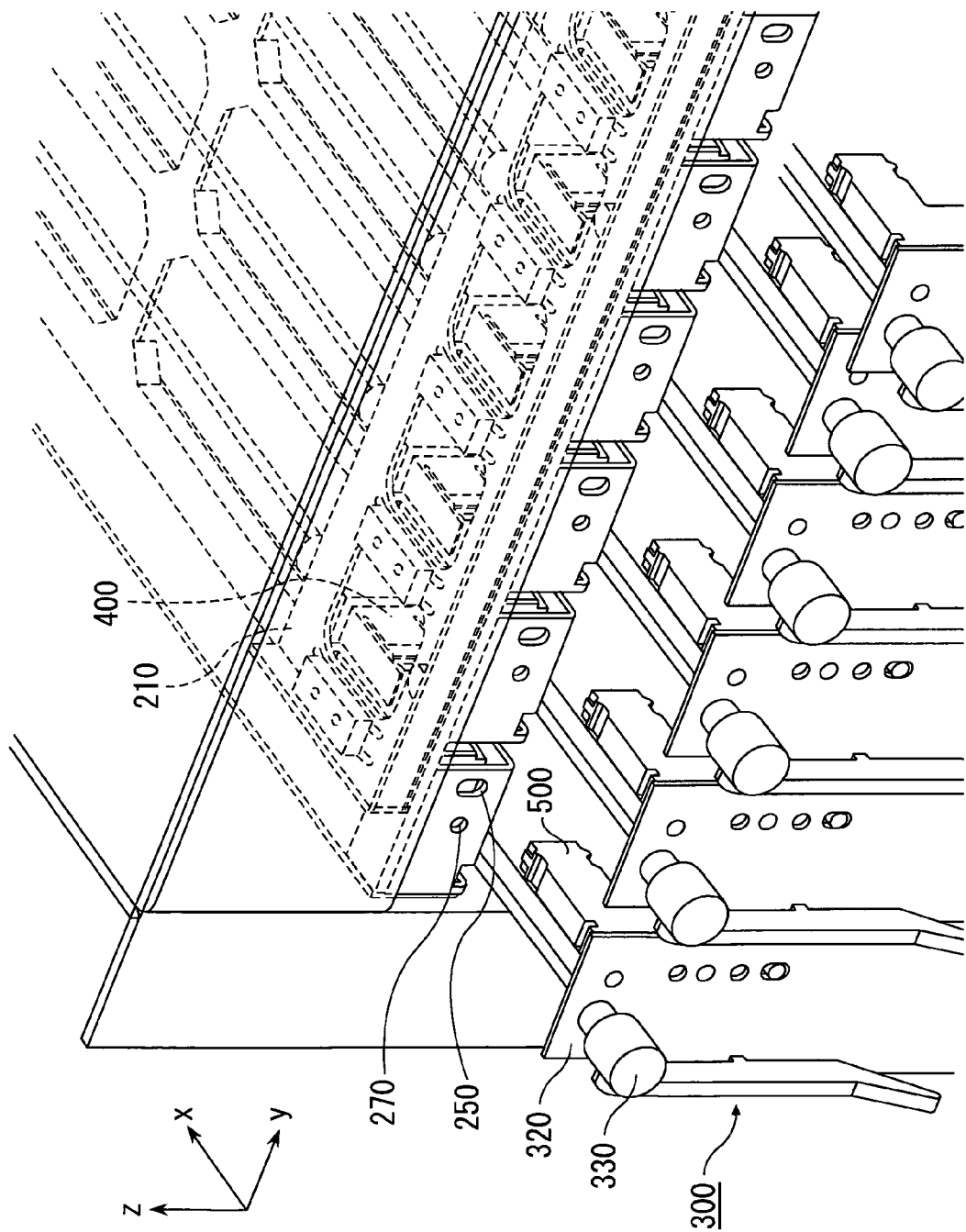
FIG. 2 is a partial, enlarged view showing the assembly of FIG. 1, wherein a plurality of cards are being inserted into a shelf.
Figure 3:
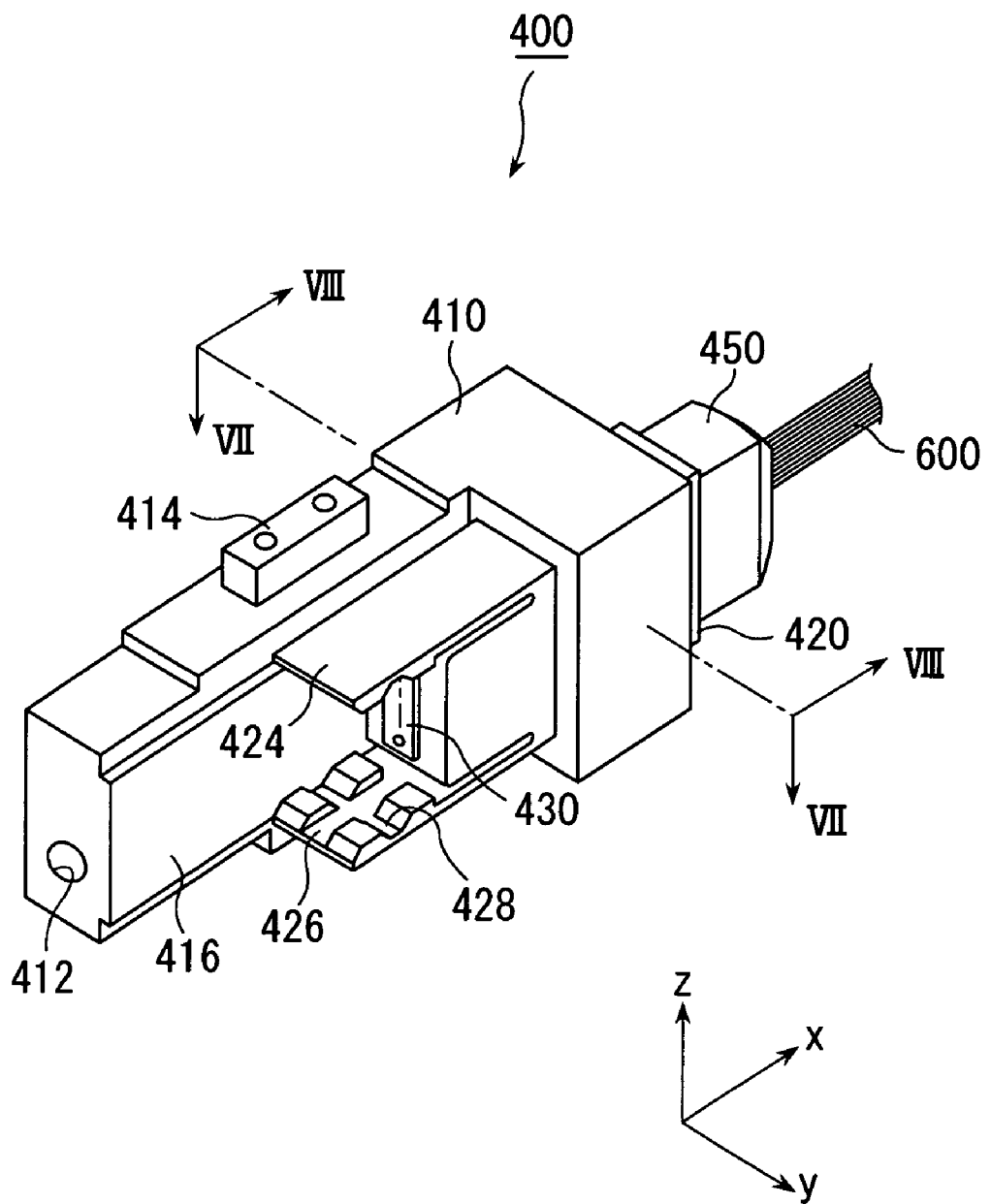
FIG. 3 is a perspective view showing a receptacle unit of FIG. 2.

With reference to FIGS. 1 and 2, the shelf 200 has a front side and a rear side in an x-direction, has its height in a z-direction and has its width in a y-direction. The shelf 200 comprises a bridge 210 as its upper part in the z-direction. The bridge 210 has a rectangular plate like portion which extends in the x-direction and the y-direction. The bridge 210 has a ladder-like shape as seen from the above in the z-direction. In detail, the bridge 210 has large windows and rungs which are alternately arranged in the y-direction. To the rungs of the ladder shaped bridge 210, receptacle units 400 are attached, respectively. The receptacle units 400 serve as first connection units for first optic fibers 600, as shown in FIG. 3. The receptacle units 400 will be explained in detail afterwards.

Figure 9:
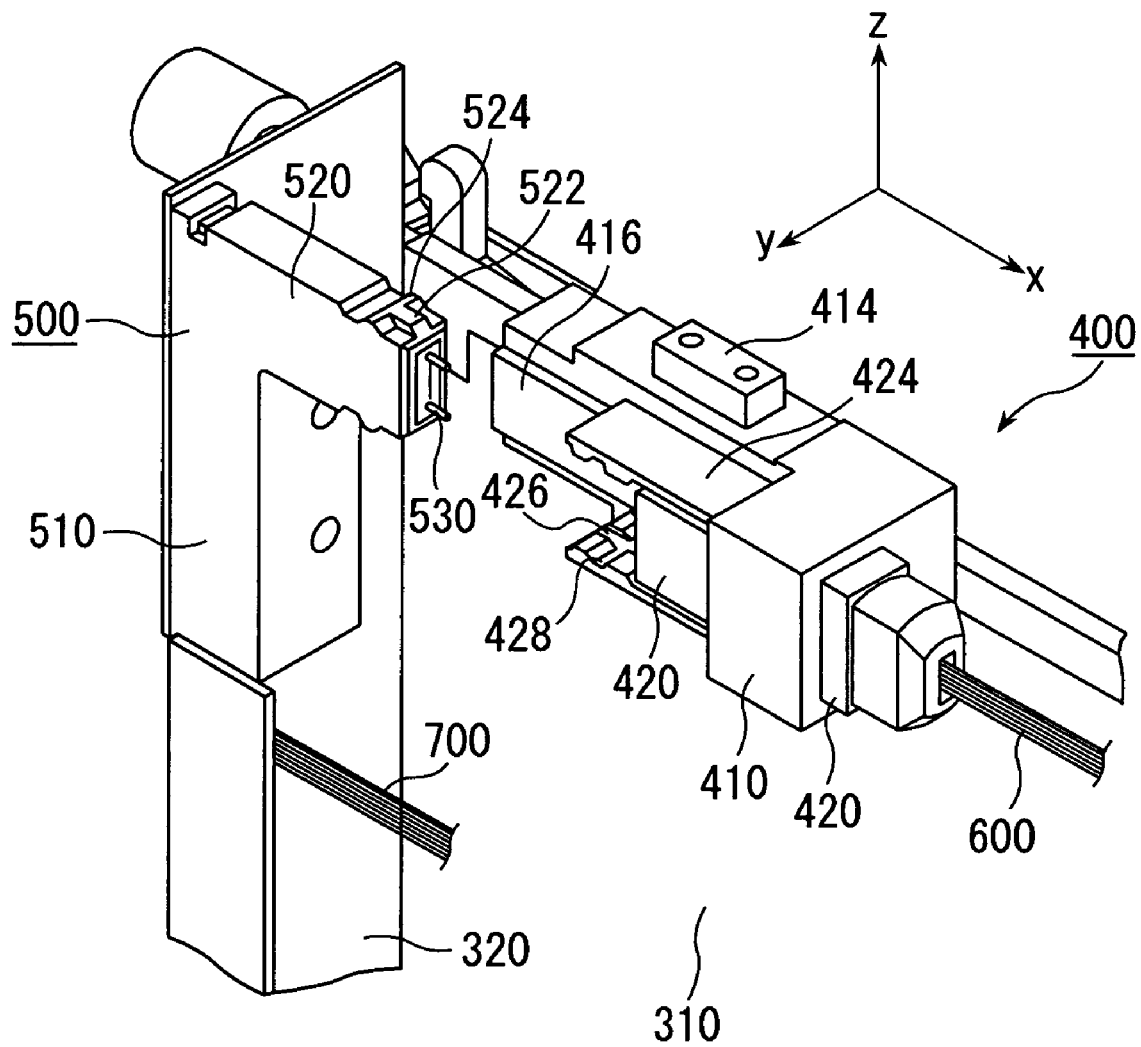
FIG. 9 is a perspective view showing the receptacle unit and a plug unit of FIG. 2, wherein the receptacle unit and the plug unit are not mated with each other.
Figure 10:
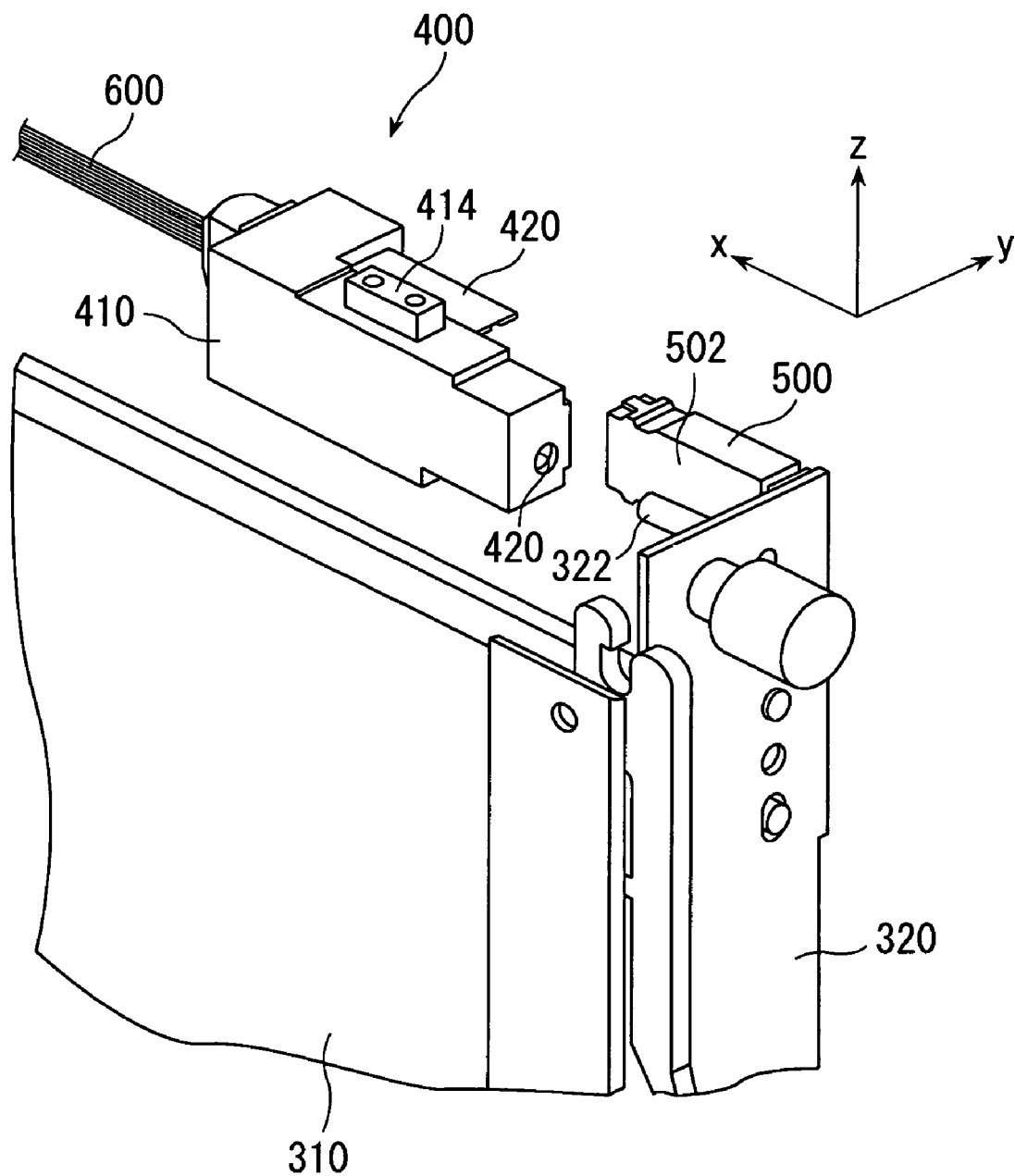
FIG. 10 is another perspective view showing the receptacle unit and the plug unit, wherein the receptacle unit and the plug unit are not mated with each other.
Figure 11:
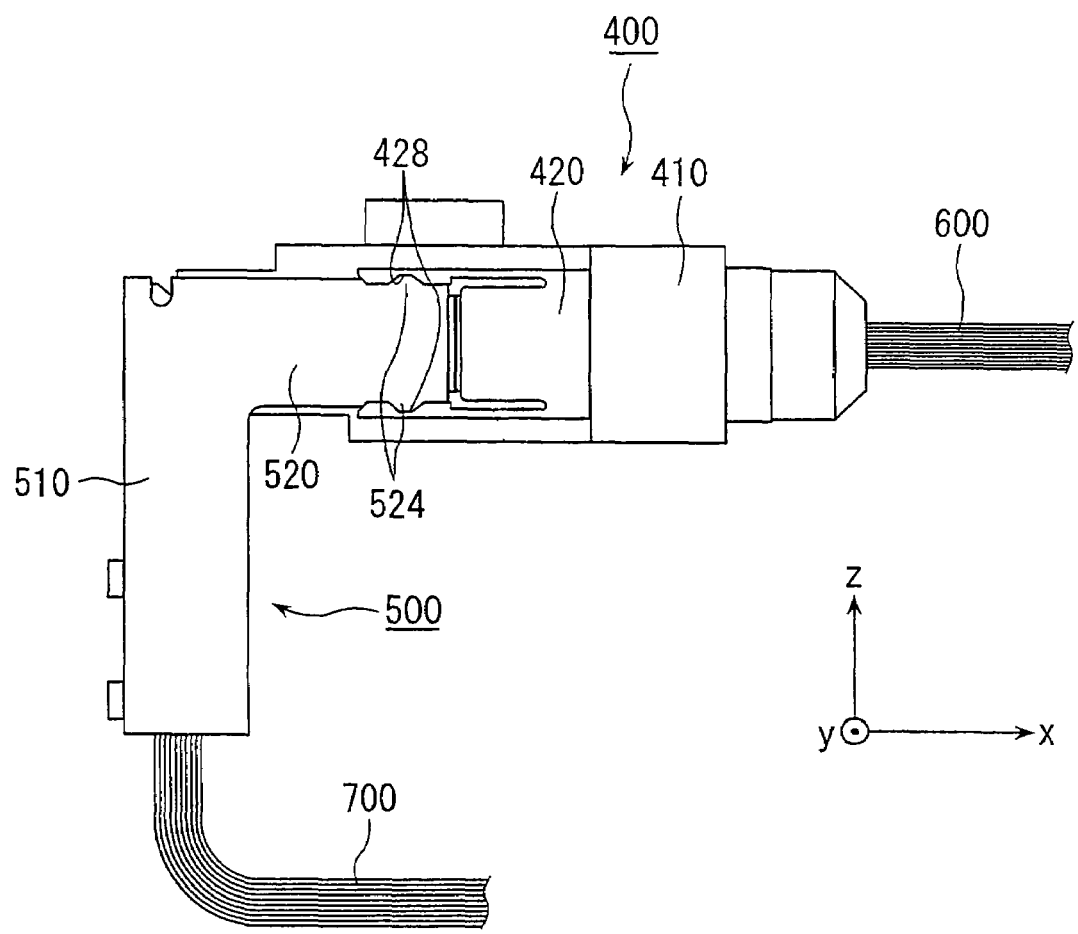
FIG. 11 is a side view showing the receptacle unit and the plug unit, wherein the receptacle unit and the plug unit are mated with each other.

With reference to FIGS. 1, 2 and 9, each of the cards 300 comprises a circuit board 310 and a front panel 320. The circuit board 310 has a principal surface defined by the x-direction and the y-direction. The front panel 320 is fixed to the front edge of the circuit board 310. To the front panel 320, a plug unit 500 is attached. The plug unit 500 serves as a second connection unit for second optic fibers 700, as shown in FIG. 9. Since each card 300 is the ATCA card, the card 300 has a card alignment pin 322. As shown in FIG. 10, the card alignment pin 322 projects and extends from the back surface of the front panel 320, i.e. the surface on which the plug unit 500 is installed. As apparent from FIG. 2, the card alignment pin 322 is inserted into a card alignment hole 250 at the front side of the shelf 200 upon the insertion of the card 300 into the shelf 200.

Figure 7:
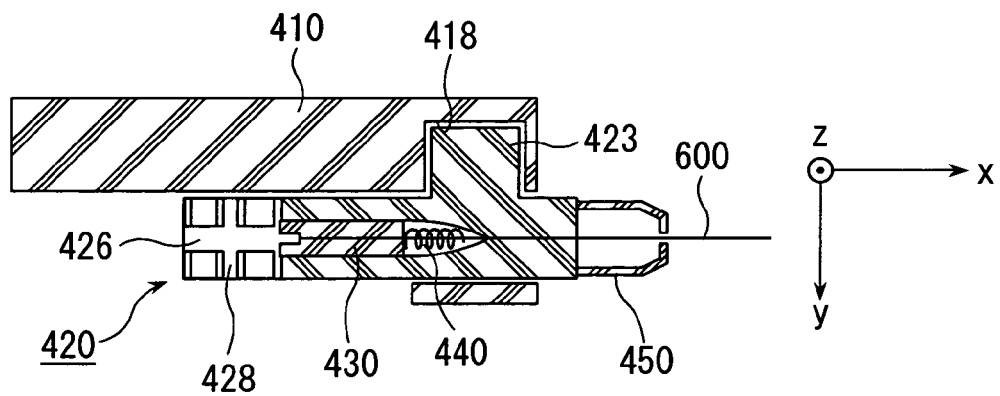
FIG. 7 is a cross-sectional view showing the receptacle unit of FIG. 3, taken along lines VII-VII.

With reference to FIG. 3, each of the receptacle units 400 comprises a body 410 and an optic connector 420. As schematically shown in FIG. 7, the optic connector 420 is provided with a MT (mechanically transferable) ferrule 430 which is slidably held by the optic connector 420. In the optic connector 420, the MT ferrule 430 is urged by a spring 440 to move forwards in the x-direction, i.e. towards the plug unit 500 corresponding thereto. The MT ferrule 430 slidably holds the first optic fibers 600 which are inserted from the rear portion of the optic connector 420 through a boots 450 in the x-direction.

With reference to FIGS. 9 and 10, each of the plug unit 500 comprises a fixed portion 510 and an optic connector portion 520. The fixed portion 510 is fixed to the front panel 320. The optic connector portion 520 projects from the fixed portion 510 in the x-direction. In the optic connector portion 520, a MT ferrule 530 is installed. The MT ferrule 530 slidably holds the second optic fibers 700 which are inserted through the fixed portion 510 and the optic connector portion 520. Upon the connection of the plug units 500 to the receptacle units 400, the first optic fibers 600 are coupled to and aligned with the second optic fibers 700. In detail, the blind mate connections between the plug units 500 and the respective receptacle units 400 are achieved by the following structures of the plug units 500 and the receptacle units 400.

Figure 4:
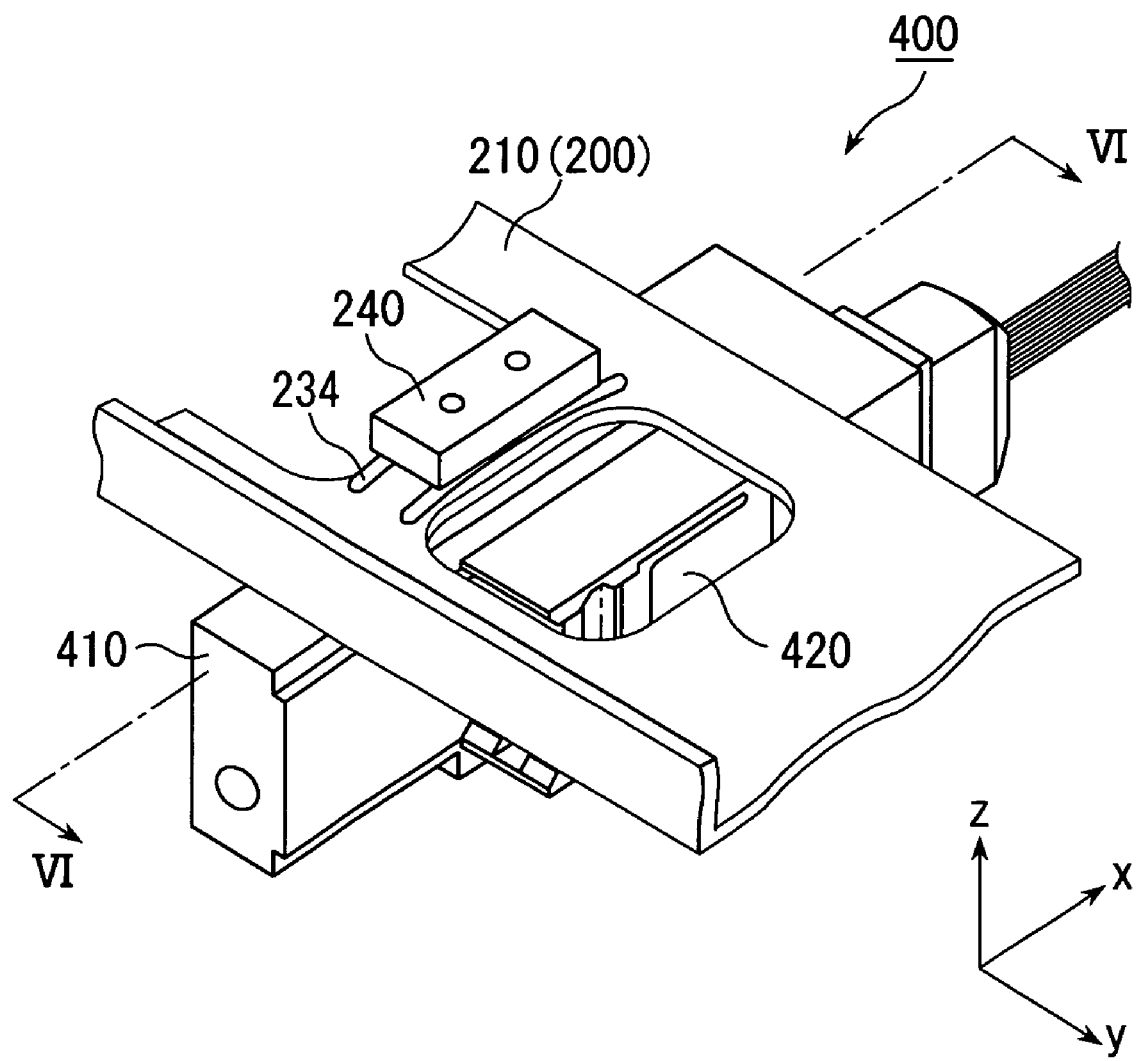
FIG. 4 is a perspective view showing the receptacle unit and parts of the shelf.
Figure 5:
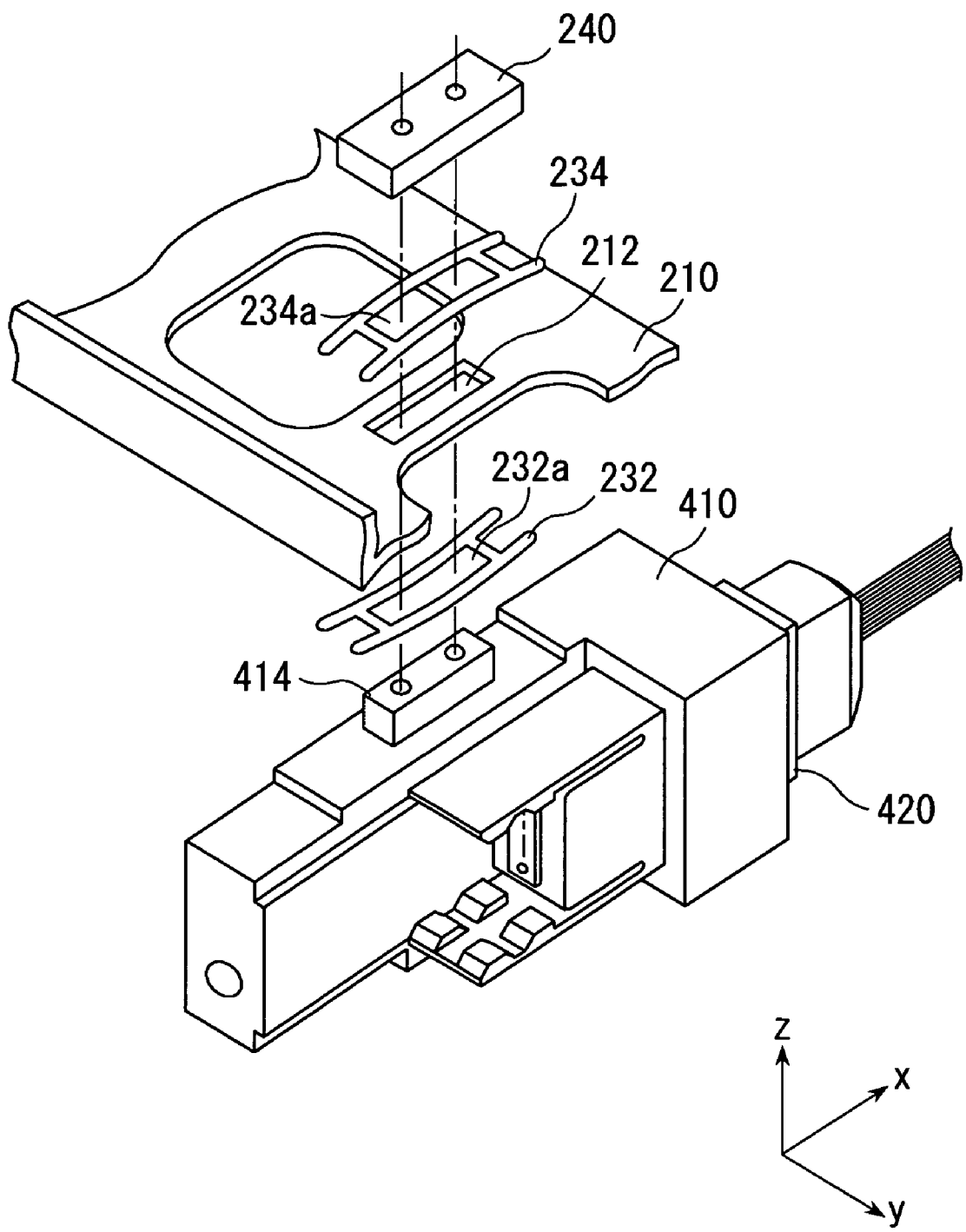
FIG. 5 is an exploded, perspective view showing the receptacle unit and the parts of the shelf of FIG. 4.
Figure 6:
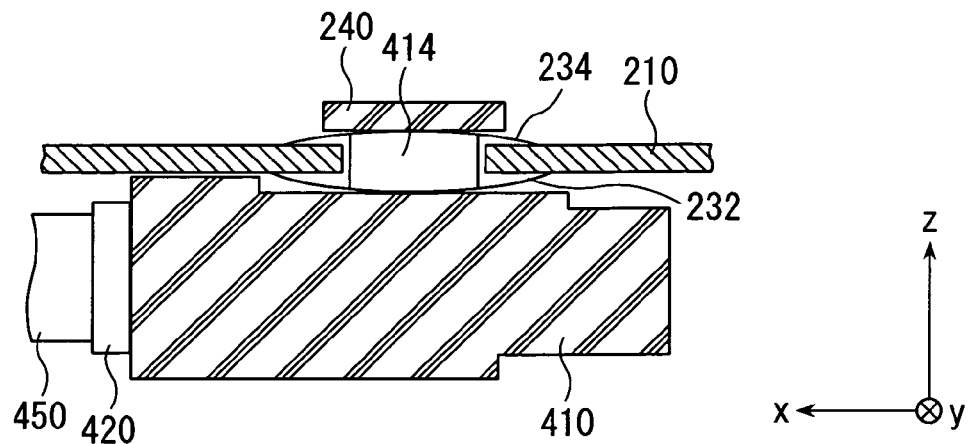
FIG. 6 is a cross-sectional view showing the receptacle unit and the parts of the shelf of FIG. 4, taken along lines VI-VI.

With reference to FIG. 3, the body 410 is provided with a neck 414, which is formed on the upper portion of the body 410 in the z-direction and has a rectangular parallelepiped shape. In this embodiment, the neck 414 is formed with screw holes extending in the z-direction. As understood from FIGS. 4 to 6, the neck 414 is inserted into a reception hole 232a of a lower plate spring 232, a small window 212 of the bridge 210 and a reception hole 234a of an upper plate spring 234 and is connected to a block 240 which is larger than the small window 212 and the reception hole 234a. In this embodiment, the lower plate spring 232 is curved downwards, while the upper plate spring 234 is curved upwards. The block 240 is formed with screw holes, through which screws are inserted into the screw holes of the neck 414 so that the body 410 is floatingly supported by the bridge 210. Specifically, the neck 414 has a size smaller than the reception hole 232a, the small window 212 and the reception hole 234a in the xy plane defined by the x-direction and the y-direction. In addition, as best shown in FIG. 6, the neck 414 has a height (a size in the z-direction) larger than the thickness of the bridge 210. With the explained structure, the body 410 is freely supported by the bridge 210 so that the body 410 is movable in the z-direction. Furthermore, as described above, the size of the neck 414 is smaller than the reception hole 232a, the small window 212 and the reception hole 234a in the xy plane so that the body 410 is also movable in the x-direction and the y-direction.

Figure 8:
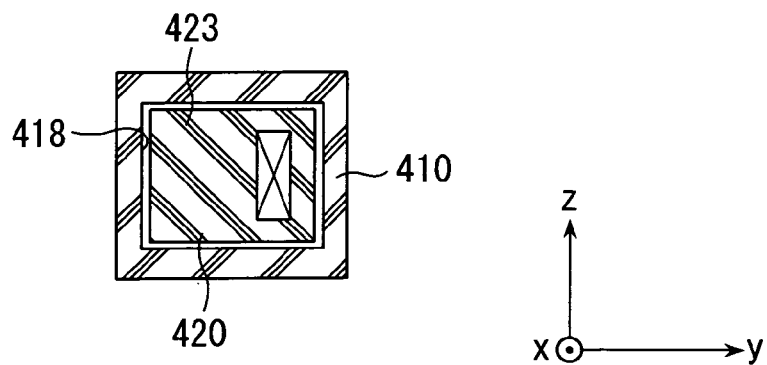
FIG. 8 is a cross-sectional view showing the receptacle unit of FIG. 3, taken along lines VIII-VIII.

The optic connector 420 of the present embodiment is floatingly supported by the body 410. The optic connector 420 has an accommodated portion 423 which projects in the y-direction from the main portion of the optic connector 420, as best shown in FIG. 7. The body 410 has an accommodation portion 418 which is recessed in the main portion of the body 410 in the y-direction and freely accommodates the accommodated portion 423 of the optic connector 420. As shown in FIG. 8, the body 410 has a space slightly larger than the size of the optic connector 420 in a cross-section at the accommodation portion 418 and the accommodated portion 423 so that the optic connector 420 is slightly movable in the y-direction and the z-direction. Thus, the optic connector 420 is double-floatingly supported by the shelf 200.

With reference to FIG. 3, the body 410 is formed with a guide hole 412, which extends in the x-direction from the front end of the body 410 towards the rear end of the body 410. As seen from FIGS. 2 and 10, the guide hole 412 receives the card alignment pin 322 stuck out of the card alignment hole 250 of the shelf 200 upon the insertion of the card 300 into the shelf 200. The guide hole 412 has a size slightly larger than the card alignment pin 322. Therefore, the guide hole 412 of the present embodiment can freely receives the card alignment pin 322 so that the plug unit 500 is roughly guided towards the receptacle unit 400.

With reference to FIGS. 3 and 9, the body 410 is formed with a surface 416 which is parallel with the xz plane defined by the x-direction and the z-direction. The surface 416 is positioned nearer the optic connector 420 in the y-direction. On the other hand, the optic connector portion 520 of the plug unit 500 has a flat surface 502 facing the circuit board 310, as best shown in FIG. 10. Upon insertion of the card 300 to the shelf 200, the surface 416 receives and regulates the flat surface 502 of the plug unit 500 in the y-direction, while allowing the plug unit 500 to move in the x-direction and the z-direction. In other words, the surface 416 of the body 410 serves as a movement regulator which regulates a movement of the plug unit 500 in the y-direction upon the insertion of the card 300 to the shelf 200. The illustrated surface 416 extends to the front end of the body 410 in the x-direction, but the present invention is not limited thereto. For example, the surface 416 may have a front edge positioned away from the front end of the body 410 in the x-direction. In this case, the body 410 may further have a bevel portion between the front edge of the surface 416 and the front end of the body 410 to guide the plug unit 500.

With reference to FIGS. 3, 7 and 9, the optic connector 420 comprises arms 424. The arms 424 are positioned at the upper and the lower sides of the optic connector 420 in the z-direction and extend in the x-direction. The arms 424 are parallel to each other and are provided with cross-shaped recesses which are formed on the surfaces of the arms 424 facing each other. In detail, each of the cross-shaped recesses consists of a recess 426 extending in the x-direction and a recess 428 extending in the y-direction and is positioned at the front portion of the arm 424 in the x-direction.

With reference to FIG. 9, the optic connector portion 520 of the plug unit 500 is formed with T-shaped protrusions which are positioned on the upper and the lower surfaces of the optic connector portion 520 in the z-direction. In detail, each of the T-shaped protrusions consists of a protrusion 522 extending in the x-direction and a recess 524 extending in the y-direction and is positioned at the end portion of the optic connector portion 520 in the x-direction.

The recesses 426 of the arms 424 guide the respective protrusions 522 of the optic connector portion 520 so that the plug unit 500 is smoothly and suitably mated with the receptacle unit 400. In other words, the combinations of the recesses 426 and the respective protrusions 522 serve as a position adjuster which adjusts a relative position between the optic connector 420 and the optic connector portion 520 in the y-direction and the z-direction so that the optic connector 420 is led to be connected to the optic connector portion 520 whose movement is regulated by the surface 416 of the body 410.

The other protrusions 524 are engaged with the other recesses 428 upon the mate of the optic connector 420 and the optic connector portion 520 to prevent the undesirable disconnection between the optic connector 420 and the optic connector portion 520. In other words, the combinations of the other recesses 428 of the arms 424 and the other protrusions 524 of the optic connector portion 520 serve as a locking mechanism which locks the connection of the optic connector 420 and the optic connector portion 520.

The recesses 426 and 428 may be separately formed on each arm 424. If the recesses 426 and the recesses 428 be separately formed, the protrusions 522 and the protrusions 524 are also separately formed so that the position adjuster and the locking mechanism are separately positioned. The optic connector 420 may have protrusions, while the optic connector portion 520 may have recesses corresponding to the protrusions. The optic connector 420 may have recesses and protrusions, while the optic connector portion 520 may have protrusions and recesses corresponding to the recesses and the protrusions of the optic connector 420.

The illustrated arms 424 are designed so that the arms 424 do not extend over the front end of the body 410, especially, the front edge of the surface 416. As a result of the configuration, the regulation by the movement regulator is carried out before the adjustment by the position adjuster upon the insertion of the card 300 to the shelf 200.

Next explanation will be made about connection operations between the plug unit 500 and the receptacle unit 400 of the assembly 100 according to the present embodiment.

At the beginning of the insertion of the card 300 into the shelf 200, the flat surface 502 of the plug unit 500 is brought into contact with the surface 416 of the receptacle unit 400 so as to carry out rough-positioning of the plug unit 500 in the y-direction with respect to the receptacle unit 400. Next, the card alignment pin 322 of the card 300 is inserted into the guide hole 412 of the receptacle unit 400 so as to roughly guide the plug unit 500 to the receptacle unit 400. Upon the rough-positioning and the rough-guiding, the body 410 is forced to move in the z-direction, and the rough positioning of the body 410 in the z-direction is achieved. Note here that, because the card alignment pin 322 is designed in compliance with the ATCA standard, the length of the card alignment pin 322 is shorter than that of the optic connector portion 520 of the plug unit 500 so that the rough-positioning is carried out before the rough-guiding. However, the present invention is not limited thereto. The card alignment pin 322 and/or the optic connector portion 520 may be designed so that the rough-positioning is carried out after the rough-guiding, if the design may not be compliant with the standard.

As the card 300 is further inserted into the shelf 200 with the movement regulation and the rough-guiding, the optic connector 420 floatingly supported by the body 410 moves so as to mate the protrusions 522 of the plug unit 500 with the recesses 426 of the receptacle unit 400. As apparent from the above, the movement of the optic connector 420 provides a fine adjustment of the relative position between the optic connector 420 of the receptacle unit 400 and the optic connector portion 520 of the plug unit 500. Note here that the fine adjustment of the optic connector 420 as well as the rough-positioning of the body 410 is carried out automatically upon the insertion of the card 300 to the shelf 200 in the present embodiment because of the double-floating support structure of the optic connector 420 by the shelf 200. The automated rough-positioning of the body 410 and the automated fine adjustment of the optic connector 420 result in the blind mate connection between the plug unit 500 and the receptacle unit 400.

The mated state of the plug unit 500 and the receptacle unit 400 is locked by the engagement of the protrusions 524 and the recesses 428, as mentioned above.

Next, the captive retention screw 330 of the card 300 is inserted into the screw hole 270 of the shelf 200, as seen from FIG. 2. As the result, the card 300 is fastened securely to the shelf 200 so that the card 300 is prevented from being undesirably released from the shelf 200.

Although the plug unit 500 and the receptacle units 400 are positioned at the upper part of the card 300 and the upper part of the shelf 200, respectively, in the above-mentioned embodiment, the present invention is not limited thereto, and the plug unit 500 and the receptacle unit 400 may be positioned at another part of the card 300 and another part of the shelf 200, respectively. For example, the plug unit 500 and the receptacle unit 400 may be positioned at the lower part of the card 300 and the lower part of the shelf 200, respectively. In addition, the plug units 500 and the receptacle units 400 may be positioned at the upper and the lower parts of the card 300 and the upper and the lower parts of the shelf 200, respectively. In the last case, the number of channels based on optical fiber connections can be increased twice.

The present application is based on a Japanese patent application of JP2007-142473 filed before the Japan Patent Office on May 29, 2007, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An assembly comprising:
   a shelf which has a front side and a rear side in a first direction, has a height of the shelf in a second direction perpendicular to the first direction and has a width of the shelf in a third direction perpendicular to the first and the second directions;
   a plurality of first connection units each of which comprises a body and an optic connector, each of the bodies being floatingly supported by the shelf and being positioned in the vicinity of the front side of the shelf, the optic connectors being floatingly supported by the bodies, respectively, each of the optic connectors holding at least one first optic fiber;
   a plurality of cards each of which has a principal surface defined by the first and the second directions and has a front edge corresponding to the front side of the shelf, each of the cards being inserted along the first direction into the shelf so that the card is detachably held by the shelf; and
   a plurality of second connection units each of which holds at least one second optic fiber, each of the second connection units being attached to a corresponding one of the cards and being positioned to the front edge of the corresponding card, each of the second connection units being detachably mated to a corresponding one of the optic connectors so that the second optic fiber of the second connection unit is aligned with the first optic fiber of the corresponding optic connector.

2. The assembly according to claim 1, wherein:
   the bodies are floatingly supported by the shelf so that each of the bodies is movable in the second direction; and
   the optic-connectors are floatingly supported by the bodies, respectively, so that each of the optic-connectors is movable in the second and the third directions.

3. The assembly according to claim 1, wherein:
   each of the bodies comprises a movement regulator which regulates a movement of a corresponding one of the second connection units in the third direction when a corresponding one of the cards is inserted into the shelf; and each of the optic connectors comprises a position adjuster which adjusts a position of the optic connector in the second and the third directions and leads the optic connector to be connected to the corresponding second connection unit whose movement is regulated by the movement regulator.

4. The assembly according to claim 3, wherein:
the second connection units have flat surfaces, respectively, each of which is parallel to the corresponding card; and
the movement regulator has a surface which is defined by the first and the second directions and which receives the flat surface of the corresponding second connection unit in the third direction to regulate the movement of the second connection unit in the third direction.

5. The assembly according to claim 3, wherein:
each of the second connection units has a portion connected to the corresponding optic connector, the portion having side surfaces in the second direction, the side surfaces being formed with first recesses or protrusions, respectively, the first recesses or protrusions extending along the first direction;
each of the position adjusters comprises two arms which extend from the optic connector along the first direction and which are parallel to each other;
the arms have surfaces which face each other and on which second protrusions or recesses are formed, the second protrusions or recesses extending along the first direction; and upon the insertion of the card, the first recesses or protrusions are mated with the second protrusions or recesses so that the position of the optic connector with respect to the corresponding second connection unit is adjusted.

6. The assembly according to claim 3, wherein:
each of the cards comprises a front panel which is fixed to the front edge;
each of the front edges is provided with a guide pin which extends in the first direction; and
each of the bodies is formed with a guide hole which freely receives a corresponding one of the guide pins.

7. The assembly according to claim 6, wherein:
each of the cards is an ATCA (Advanced Telecom Computing Architecture) card or blade compliant to an ATCA standard;
the ATCA card or blade is provided with a card alignment pin; and
the card alignment pin is used as the guide pin.

8. The assembly according to claim 1, wherein:
the shelf comprises a bridge which extends in the first and the third directions and is positioned at the front side;
each of the bodies is floatingly supported by the bridge;
each of the cards comprises a front panel which is fixed to the front edge; and
each of the second connection units is fixed to the front panel of a corresponding one of the cards.

9. The assembly according to claim 1, further comprising a locking mechanism which locks the connection of the optic connector and the second connection unit.

* * * * *